United States Patent [19]

Woodrum et al.

[11] 3,891,708

[45] June 24, 1975

[54] PURIFICATION OF DIMETHYLAMINOPROPYLCHLORIDE HYDROCHLORIDE

[75] Inventors: Guy Thomas Woodrum, Canonsburg; Richard E. Barnett, Corapolis, both of Pa.

[73] Assignee: Calgon Corporation, Pittsburgh, Pa.

[22] Filed: Mar. 28, 1974

[21] Appl. No.: 455,707

[52] U.S. Cl............................................ 260/583 N
[51] Int. Cl................................................. C07c 87/127
[58] Field of Search................................. 260/583 N

[56] References Cited
UNITED STATES PATENTS

| | | | |
|---|---|---|---|
| 2,400,934 | 5/1946 | Jones | 260/583 N X |
| 2,527,017 | 10/1950 | Luten et al. | 260/583 N |
| 2,713,597 | 7/1955 | Yalowitz et al. | 260/583 N |
| 3,406,204 | 10/1968 | Bathellier et al. | 260/583 N |
| 3,723,529 | 3/1973 | Pitts et al. | 260/583 N |

*Primary Examiner*—Paul F. Shaver
*Attorney, Agent, or Firm*—Harry E. Westlake, Jr.; Frank M. Mahon; Raymond M. Speer

[57] ABSTRACT

3-Dimethylaminopropylchloride hydrochloride, or the free amine, is purified, in both batch and continuous processing, by contacting aqueous solutions containing the salt or the free amine with activated carbon.

6 Claims, No Drawings

PURIFICATION OF DIMETHYLAMINOPROPYLCHLORIDE HYDROCHLORIDE

This invention relates to a new process for the purification of 3-dimethylaminopropylchloride hydrochloride (DMPC.HCl) or of the liberated amine, 3-dimethylaminopropylchloride (DMPC) through the application of adsorption techniques. More particularly, the instant invention relates to the purification, by both batch and continuous processing, of aqueous solutions of DMPC.HCl or DMPC by passing such solutions through an activated carbon adsorption column, or by contacting such solutions with activated carbon in a batch treatment tank.

3-Dimethylaminopropylchloride, usually available commercially as the hydrochloride salt, among its other uses, is an important monomer in the synthesis of a class of water soluble cationic 3-ionene polymers which find application in a variety of industrial processes including flocculation and precipitation of many substances from water, modification of starches in the preparation of cationic starches and preparation of electroconductive coatings used in the manufacture of electroconductive papers employed in non-impact printing systems. Notably, homopolymers of 3-dimethylaminopropylchloride are employed as electroconductive polymers in the manufacture of electroconductive base sheets. Such polymers are prepared by polymerization in aqueous solution.

Aqueous solutions of commercially available 3-dimethylaminopropylchloride hydrochloride or the free amine, vary in color from light yellow to dark amber. This color, or impurity, is carried through upon polymerization of the liberated 3-dimethylaminopropylchloride resulting in polymer products of widely varying color. Such wide spread variation in product color is unacceptable in polymers intended for the manufacture of electroconductive base sheets. Further, the impurity in the monomer also may cause other undesirable polymer variations such as variations in clarity and viscosity.

Although applicants have found that the impurities could be removed effectively from the free amine, by vacuum distillation techniques leading to a preferential distillate which is clear and, "water white" and which, upon subsequent polymerization, led to a clear and, "water white," polymer product, such vacuum distillation techniques do not lend themselves readily to continuous processing and are prohibitively expensive as a commercial process. In addition, the amine is easily activated in this form and may polymerize at distillation temperature, creating additional and undesirable processing problems.

Many attempts to apply more economic adsorption techniques to the purification of aqueous solutions of 3-dimethylaminopropylchloride hydrochloride or the free amine proved unsuccessful. Applicants found that passing aqueous solutions of 3-dimethylaminopropylchloride hydrochloride or liberated 3-dimethylaminopropylchloride through adsorption columns packed with conventional adsorbents such as silica-gel, kaolin clay, microcrystallinecellulose, activated alumina, fuller's earth and bone char failed effectively to remove the impurities from the amine solutions giving monomer solutions unsuited to the preparation of an acceptable polymer product.

The instant invention is based upon applicants discovery that, surprisingly, the impurities are removed when aqueous solutions of 3-dimethylaminopropylchloride hydrochloride or liberated 3-dimethylaminopropylchloride are passed through a granular activated carbon adsorption column, or contacted with activated carbon in a batch tank. Effluents from a single pass of both solutions taken from such columns, or separated from batch tank suspensions by filtration, are "water white," and clear and, in this respect, are indistinguishable from purified solutions obtained by vacuum distillation. When polymerized, the carbon treated monomer produces a clear, "water white," polymer product suitable in all respects as an electroconductive polymer for use in the manufacture of electroconductive base sheets. It is contemplated, therefore, that aqueous solutions of commercially available 3-dimethylaminopropylchloride hydrochloride and liberated 3-dimethylaminopropylchloride will be purified by contacting such solutions with an effective quantity of activated carbon.

Any granular or powdered activated carbon may be employed as the adsorbent in the purification process of the instant invention. Desirably, such activated carbon will have a mesh size of from about 8 to about 325 mesh (United States Sieve Series). Preferably, such activated carbon will have a mesh size of from about 14 to about 40 mesh. Typical activated carbon adsorbents which may be employed include, for example, Pittsburgh Activated Carbon-type "BPL" Activated Carbon (8 × 30 United States Sieve Series), and Pittsburgh Activated Carbon-type "CPG" (14 × 40 United States Sieve Series). The treatment level of activated carbon may vary from a level of 1 to 3500 pounds of monomer per pound of carbon, but a treatment level of about 7 to 160 pounds of monomer per pound of carbon is generally preferred in column operation and from about 4 to about 10 pounds in batch operation. The concentration of 3-dimethylaminopropylchloride hydrochloride or 3-dimethylaminopropylchloride in the aqueous solution used as the starting material for purification may vary from 1 to 99 percent by weight. Usually the concentration is about 70 percent by weight for DMPC.HCl. The concentration of the free amine, 3-dimethylaminopropylchloride, is usually 95 percent by weight.

Advantages to be obtained through practice of the purification process of the instant invention and the best mode contemplated by applicants for carrying out the process of the instant invention are illustrated in the following examples.

EXAMPLE 1

A 70 percent aqueous solution of DMPC.HCl was prepared by dissolving the DMPC.HCl in distilled water at 25°C. This solution was then reacted with a stoichiometric quantity of 50 percent sodium hydroxide. Stoichiometry is based on the DMPC.HCl. The liberated DMPC was separated from the water phase and placed in a glass flask equipped with vacuum distillation equipment. The temperature of the flask contents was gradually elevated to 35°–40°C under 27 inches of vacuum. Preferential distillate was collected at this temperature. The distillate was clear and "water white." Polymerization of the distillate material produced a clear, "water white" product. Viscosity of the 50 percent polymer solution was 2300 cps.

EXAMPLE 2

A 70 percent aqueous solution of DMPC.HCl was prepared by dissolving the DMPC.HCl in distilled water at 25 percent C. 102 gms of this solution were then put in a ⅝ inch glass column affixed with a stop-cock for fluid control. 34.1 gms. of granular (activated) carbon were then charged to the column. The first 200 gms. of the effluent from the column were recycled to remove carbon fines. The resultant effluent was water clear with an adsorbance of 0 at a wave length of 362A°. The treated solution was reacted with a stoichiometric quantity of sodium hydroxide to liberate free DMPC and then polymerized to produce a clear, "water white" product. Polymer viscosity at 50 percent solids was 2370 cps.

EXAMPLE 3

A 70 percent aqueous solution of DMPC.HCl was prepared by dissolving the DMPC.HCl in distilled water at 25°C. This solution was then reacted with a stoichiometric quantity of 50 percent sodium hydroxide. Stoichiometry is based on the DMPC.HCl. The liberated DMPC was separated from the water phase. 102 gms. of the material were then put in a ⅝ inch glass column affixed with a stop-cock for fluid control. 34.1 gms. of granular (activated) carbon were then charged to the column. The first 200 gms. of the effluent from the column were recycled to remove carbon fines. The resultant effluent was water clear.

EXAMPLE 4

A 70 percent aqueous solution of DMPC.HCl was prepared by dissolving the DMPC.HCl in distilled water at 25°C. 250 gms. of this solution were put in a 400 ml. beaker with 20 gms. of CAL 14 × 40 carbon. This slurry was agitated for ½ hour and then filtered to remove the carbon. Absorption of the solution decreased from an initial valve of 0.45 to 0.04 (absorption measurements taken at a wave length of 362A°).

EXAMPLE 5

A 70 percent aqueous solution of DMPC.HCl was prepared by dissolving the DMPC.HCl in distilled water at 25°C. 250 gms. of this solution were put in a 400 ml. beaker with 10 gms. of CAL 14 × 40 carbon. This slurry was agitated for ½ hour and then filtered to remove the carbon. Absorption of the solution decreased from an initial valve of 0.45 to 0.18 (absorption measurements taken at a wave length of 362A°).

The monomer solutions and polymer products obtained after the carbon treatment operations as described in Examples 2, 3, 4 and 5, were indistinguishable from the monomer solution and polymer product obtained after distillation purification as described in Example 1.

The following examples confirm the ineffective removal of impurity from aqueous solutions of 3-dimethylaminopropylchloride hydrochloride or liberated 3-dimethylaminopropylchloride by similar adsorption techniques using other common adsorbents as the purifying agent.

EXAMPLE 6

180 gms. of the 70 percent aqueous solution of DMPC.HCl were charged to a ⅝ inch glass column affixed with a stopcock for fluid control. 80 gms. of silica-gel (Grade 950) were then charged to the column. The first 180 gms. of the effluent from the column were recycled to remove silica fines which initially pass through the column. The resultant effluent was the same color as the untreated DMPC solution. Absorption of this solution at a wave length of 362A° decreased from an initial valve of 0.45 to 0.37 after silica-gel treatment. DMPC purified by carbon treatment decreased the absorbance to 0.0.

EXAMPLE 7

250 gms. of the 70 percent aqueous solution of DMPC.HCl were charged to a ⅝ inch glass column affixed with a stopcock for fluid control. 24 gms. of microcrystalline cellulose were then charged to the column. The first 250 gms. of the effluent from the column were recycled to remove fines which initially pass through the column. The resultant effluent was the same color as the untreated DMPC solution. Absorption of this solution at a wave length of 362A° decreased from an initial valve of 0.45 to 0.34. This slight decrease in absorbance is most probably due to filtration of particulate matter, which would not dissolve in the DMPC solution.

EXAMPLE 8

150 gms. of the 70 percent aqueous solution of DMPC.HCl were charged to a ⅝ inch glass column affixed with a stopcock for fluid control. 50 gms. of kaolin clay were then charged to the column. The first 150 gms. of the effluent from the column were recycled to remove fines which initially pass through the column. The resultant effluent was the same color as the untreated DMPC solution. Absorption of this solution at a wave length of 362A° decreased from an initial valve of 0.45 to 0.37.

The subject matter which applicants regard as their invention is particularly pointed out and distinctly claimed as follows:

1. The process for purifying aqueous solutions of 3-dimethylaminopropylchloride or the hydrochloride salt thereof which comprises passing an aqueous solution containing from 1 to 99 percent by weight of 3-dimethylaminopropylchloride or the hydrochloride salt thereof through an adsorption column packed with activated carbon having a mesh size between 8 to 325 mesh at a treatment level of from 1 to 3500 pounds of 3-dimethylaminopropylchloride or hydrochloride salt thereof per pound of activated carbon.

2. The process of claim 1 wherein the treatment level is from 7 to 160 pounds monomer per pound of carbon.

3. The process of claim 2 wherein the activated carbon has a mesh size between 14 and 40 mesh.

4. The process for purifying aqueous solutions of 3-dimethylaminopropylchloride or the hydrochloride salt thereof which comprises slurrying an aqueous solution containing from 1 to 99 percent by weight of 3-dimethylaminopropylchloride or the hydrochloride salt thereof with activated carbon having a mesh size between 8 and 325 mesh at a treatment level of from 1 to 3500 pounds of 3-dimethylaminopropylchloride or hydrochloride salt thereof per pound of activated carbon and separating the purified solution from the slurry.

5. The process of claim 4 wherein the treatment level is from 4 to 10 pounds monomer per pound of carbon.

6. The process of claim 5 wherein the activated carbon has a mesh size between 14 and 40 mesh.

* * * * *